(12) United States Patent
Mei (10) Patent No.: US 7,298,590 B1
(45) Date of Patent: Nov. 20, 2007

(54) SUSPENSION LIMITER WITH PROXIMALLY CANTILEVERED LIMITER MEMBERS

(75) Inventor: Shijin Mei, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 350 days.

(21) Appl. No.: 10/952,283

(22) Filed: Sep. 27, 2004

(51) Int. Cl.
*G11B 5/58* (2006.01)

(52) U.S. Cl. .................... 360/245.7; 360/245

(58) Field of Classification Search ........... 360/245.7, 360/245
See application file for complete search history.

(56) References Cited

U.S. PATENT DOCUMENTS

| | | | |
|---|---|---|---|
| 6,172,853 B1 | 1/2001 | Davis et al. | |
| 6,195,237 B1 | 2/2001 | Perez | |
| 6,233,121 B1 * | 5/2001 | Pan | 360/245.7 |
| 6,417,996 B1 * | 7/2002 | Budde | 360/245.7 |
| 6,424,498 B1 * | 7/2002 | Patterson et al. | 360/245.7 |
| 6,426,851 B1 * | 7/2002 | Perez | 360/245.7 |
| 6,587,311 B1 * | 7/2003 | Niijima et al. | 360/255 |
| 6,791,798 B1 * | 9/2004 | Mei | 360/245.7 |
| 6,801,400 B2 * | 10/2004 | Fu et al. | 360/245.7 |
| 7,130,157 B2 * | 10/2006 | Sassine et al. | 360/245.7 |
| 2002/0075602 A1 * | 6/2002 | Mangold et al. | 360/245.7 |
| 2004/0070883 A1 * | 4/2004 | Mahoney et al. | 360/245.7 |
| 2005/0180052 A1 * | 8/2005 | Suzuki et al. | 360/245.7 |

\* cited by examiner

*Primary Examiner*—Jefferson Evans
(74) *Attorney, Agent, or Firm*—Intellectual Property Law Office of Joel D. Voelzke (57) ABSTRACT

A disk drive suspension and method uses two proximally cantilevered members to limit tongue movement in a suspension of a load beam having a beam portion and a flexure having a tongue. The suspension has a limiter structure comprising the two proximally cantilevered members arranged on the beam portion and the tongue respectively and intersecting for increasing engagement responsive to undue tongue travel against dislodgment.

28 Claims, 5 Drawing Sheets

SUSPENSION LIMITER WITH PROXIMALLY CANTILEVERED LIMITER MEMBERS

RELATED APPLICATION

Not applicable.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and more particularly to improvements in limiter structures for disk drive suspensions providing increased security of engagement through intersection of two proximally directed members that respond to tongue undue travel by increasing the impalement of the tongue provided member on the load beam provided member of the limiter structure.

2. Description of the Related Art

Many limiters are known and used for the purpose of preventing damaging excursions of the flexure tongue and slider toward the disk when the suspension undergoes shock. In general, known limiters are located some distance from the dimple contact point and thus do not transmit reaction force directly from the slider, but only through bridging structures. Limiter structures using beam portion members and tongue members do not arrange these members proximally for increased security upon a tongue excursion. See U.S. Pat. No. 6,172,853 to Davis, U.S. Pat. No. 6,195,237 to Perez, U.S. Pat. No. 6,233,121 to Pan, U.S. Pat. No. 6,417,996 to Budde and U.S. Pat. No. 6,424,498 to Patterson, for example.

BRIEF SUMMARY OF THE INVENTION

It is an object therefore to provide an improved disk drive suspension. It is another object to provide a suspension having an improved limiter structure against undue travel of the suspension tongue and slider under shock and under load-unload conditions. A further object is the provision of a limiter structure that includes a member vertically spaced from the slider and formed from the free proximate end of the cantilevered flexure tongue. Another object is the formation of a limiter structure cooperating part on the suspension beam portion cantilevered proximally like the tongue limiter member to interengage vertically with the tongue free end defined limiter structure to limit tongue free end travel.

These and other objects of the invention to become apparent hereinafter are realized in a disk drive suspension comprising a disk drive suspension comprising generally in a first plane a beam portion and in a second plane generally parallel to the first plane a flexure, the flexure having a proximally cantilevered tongue being adapted to carry a slider and having a proximate end, a limiter structure limiting travel of the tongue away from the beam portion, the limiter structure comprising intersected first and second proximally cantilevered members defined by the beam portion and the tongue proximate end respectively and arranged for engagement in response to undue tongue travel in a manner such that tongue travel away from the beam portion increasingly secures the engagement of the members.

In this and like embodiments, typically, the beam portion member has a flat extent within the first plane, the tongue member engaging the beam portion member flat extent, the beam portion comprises a wall extending opposite the tongue proximate end, the wall being configured to define the beam portion member in tongue member engaging relation, the beam portion being otherwise free of tongue travel limiting members, the tongue member extends from the second plane at an angle of about 45 to about 80 degrees, the beam portion member extending at an angle of about 0 degrees to the beam portion, the tongue member is U-shaped and free of bends along its longitudinal axis other than at the tongue, the tongue has a given lateral extent, and the tongue member has a lesser lateral extent, there is also included a slider having a leading edge end at the tongue proximate end, whereby the limiter structure is adjacent the slider leading edge end, the tongue member comprises left and right legs closely bracketing the beam portion member, and a cross-piece overlying the beam portion member, the cross piece having less vertical height from the tongue than the beam portion member has lateral width, and/or the tongue member has a cross piece and left and right legs bracketing the beam portion member, the legs being free of bends other than at the tongue, the cross member and legs having substantially equal widths.

In a further embodiment, there is provided a disk drive suspension comprising generally in a first plane a beam portion and in a second plane generally parallel to the first plane a flexure, the flexure having a proximally cantilevered tongue having a proximate end, a slider carried by the tongue, a limiter structure limiting travel of the tongue away from the beam portion, the limiter structure comprising intersected first and second proximally cantilevered members defined by the beam portion and the tongue proximate end respectively and arranged for engagement in response to undue tongue travel in a manner such that tongue travel away from the beam portion increasingly secures the engagement of the members.

In this and like embodiments, typically, the beam portion member is flat, the tongue member bracketing the beam portion member in engaging relation upon undue travel of the tongue, the beam portion comprises a wall extending opposite the tongue proximate end, the wall being apertured and configured within the aperture to define the beam portion member in tongue member engaging relation, the beam portion being otherwise free of tongue travel limiting members, the tongue member extends from the second plane at an angle of about 45 to about 90 degrees, the beam portion member extending at an angle of about 0 degrees to the beam portion, the tongue member is U-shaped and free of bends along its longitudinal axis other than at the tongue, the tongue has a given lateral extent, and the tongue member has a lesser lateral extent, the slider has a leading edge end at the tongue proximate end and a trailing edge end, the limiter structure being more closely adjacent the slider leading edge end, the tongue member comprises left and right legs bracketing the beam portion member, and a cross-piece overlying the beam portion member, the cross piece having less vertical height from the tongue than the beam portion member has lateral width, and the tongue member legs are free of bends other than at the tongue, the cross piece and legs having substantially equal widths.

In a further embodiment, the invention provides a disk drive suspension comprising generally in a first plane a beam portion adapted to be supported by a spring portion and a base portion, the beam portion having a proximally cantilevered limiter member, a flexure carried by the beam portion, the flexure comprising a frame and a tongue portion generally in a second plane and having a tongue proximate end cantilevered from the frame for supporting a slider, and a limiter structure limiting the tongue from undue travel, the limiter structure comprising a tongue limiter member extending from the tongue proximate end into the first plane and arranged to bracket the beam portion limiter member, the tongue member shifting distally on the beam portion member responsive to increased tongue travel against tongue limiter member dislodgement from the beam portion limiter member in tongue undue travel limiting relation.

As in previous embodiments, generally the beam portion limiter member is flat for engagement with the tongue limiter member, the beam portion comprises a wall extending opposite the tongue proximate end, the wall being configured to define the beam portion limiter member in tongue limiter member engaging relation, the tongue limiter member extends at an angle to the beam portion limiter member of about 45 to about 80 degrees, the tongue limiter member is straight beyond the tongue, the tongue has a given lateral extent, the tongue limiter member having a lesser lateral extent, there is also included a slider having a leading edge end at the tongue proximate end, whereby the limiter structure is adjacent the slider leading edge end, and the tongue limiter member comprises left and right legs bracketing the beam portion limiter member, and a crosspiece overlying the beam portion limiter member, the cross piece having less vertical height than the beam portion limiter member has lateral width.

In its method aspects the invention provides a method of limiting undue relative movement between a beam portion and flexure tongue in a disk drive suspension, the flexure tongue having a cantilevered proximate end, including cantilevering a beam portion limiter member proximally, and cantilevering a tongue limiter member proximally and vertically in beam portion member intersecting relation such that tongue travel away from the beam portion increasingly secures engagement of the members.

Typically, the method includes defining the beam portion limiter member as a flat extent coplanar with the beam portion, angling the tongue limiter member at about 45 to about 80 degrees to the beam portion limiter member, bracketing the beam portion limiter member with the tongue limiter member, supporting a slider on the tongue, and maintaining the tongue limiter free of bends other than at the tongue.

Other embodiments will appear hereinafter.

BRIEF DESCRIPTION OF THE SEVERAL VIEWS OF THE DRAWINGS

The invention will be further described in conjunction with the attached drawings in which.

DETAILED DESCRIPTION OF THE INVENTION

The invented suspension is suitable for both pico and femto form factor suspensions. It is readily formed from suitably etched parts by conventional forming techniques such as bending. Advantages of the invention suspension include a single large radius bend between the tongue free end and no further bends to complicate manufacture and increase scrap, a proximally oriented beam portion limiter member, the member being flat and unformed for ease of manufacture and limit suspension height, the tongue limiter member is at the slider leading edge for enhanced protection, reaction forces transfer directly from the slider since the limiter structure is formed from the flexure tongue and generally opposite the slider and closely adjacent the dimple contact locus for engagement opposite the slider. Other advantages include a U-shape limiter that has spaced legs fixed to the edges of the flexure tongue portion free end for stiffness and strength despite thinness, lowest vertical profile, and a cantilever flexure, proximally toward the suspension base portion such that it further engages the beam portion limiter member upon a tongue excursion and does not slip off, and the possibility of effecting the forming steps before or after other manufacturing operations.

With reference now to the drawings in detail, In FIGS. 1-4 and 6, disk drive arm 8 carries suspension 10 for angular or translational motion. Suspension 10 comprises in a generally horizontal plane a base portion 9, a spring portion 11, and a beam portion 12 and in the same or a generally parallel plane a flexure 14 separate or integral with and carried by the beam portion. Flexure 14 comprises an open frame 16 and a tongue portion 18 having a free end 22 cantilevered into the frame from the frame and extending proximally, that is toward the base portion 9. Slider 24 is supported by the tongue portion 18. A limiter structure 26 limits the tongue portion 18 from undue travel. Limiter structure 26 comprises tongue limiter member 28 which is part of the tongue free end 22 and extends angularly, e.g. at about 45 to about 80 of about 90 degrees to the second or tongue plane P-P. Tongue limiter member 28 is bent out of the tongue free end 22 and is suitably but not necessarily vertically spaced from and opposite the slider 24.

Limiter structure 26 includes a beam portion limiter member 56 and a tongue limiter member 28. Beam portion 12 of suspension 10 defines the beam portion limiter member 56 that is formed in beam portion 12 such as to be able to engage the tongue limiter member 28 against undue travel of the tongue portion 18. For this purpose, the beam portion limiter member 56 is also proximally disposed (cantilevered toward the base portion 9) as shown providing the limiter structure 26 with a pair of proximally disposed members 28, 56.

As shown, tongue limiter member 28 is interiorly open, being generally U-shaped with left and right legs 32, 34 and cross piece 36 extending therebetween parallel to the opposing area 44 of the tongue free end 22 and is arranged to be open to the opposing area 25 that surmounts slider 24. Tongue area 44 extends opposite limiter structure cross piece 36 into the flexure opening 38 in a manner to provide a locus of attachment 46 on the tongue portion 18 for attachment of the slider 24. Beam portion 12 provides a gram load onto the slider 24 through tongue portion 18 via a dimple 48. Dimple 48 can also be formed on the tongue portion 18. In either case the apex 50 of the dimple defines the locus 52 of dimple 48 contact.

Figure 5:
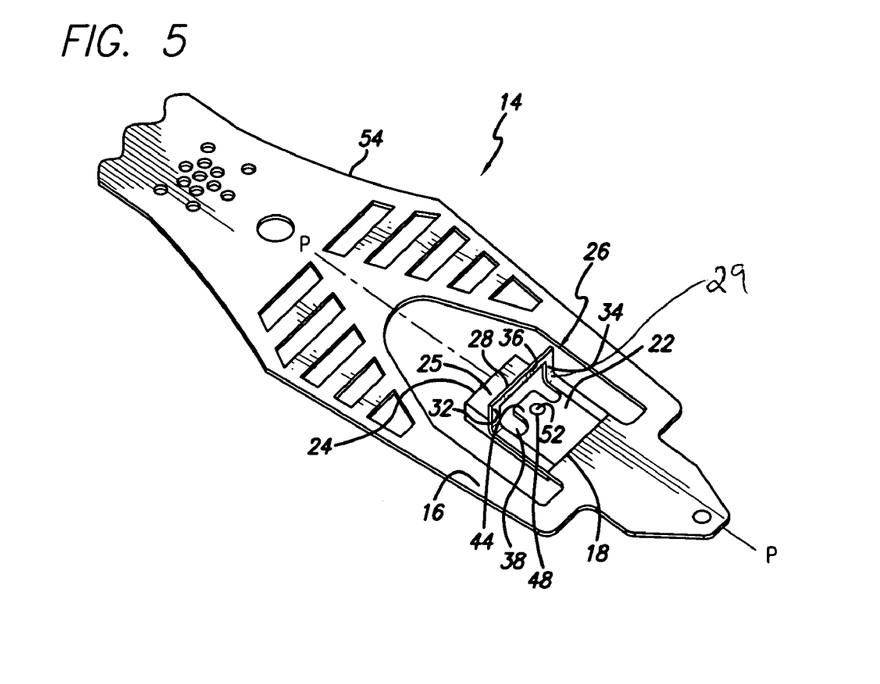
FIG. 5 is an oblique view of the formed suspension flexure.
Figure 5A:
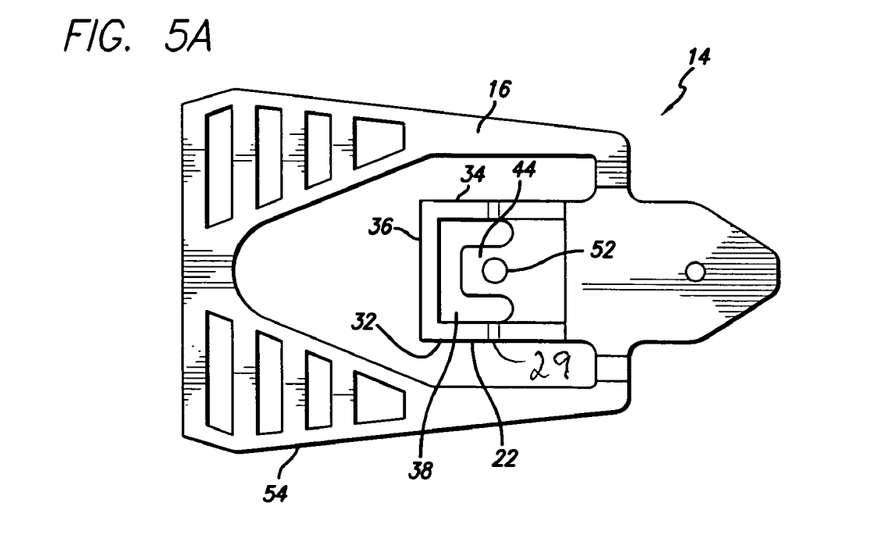
FIG. 5A is a top plan view of the suspension flexure before forming.
Figure 6:
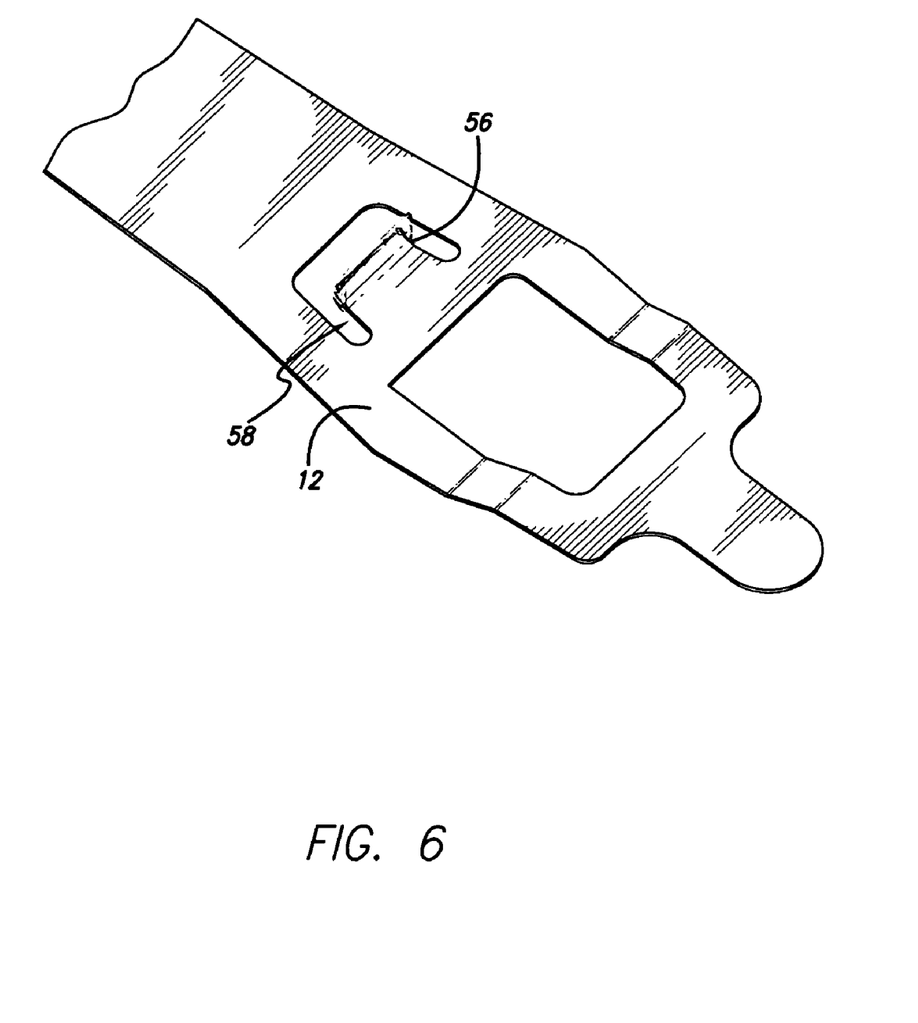
FIG. 6 is an oblique view of the formed beam portion.

As shown in FIGS. 5 and 5A, the tongue limiter member 28 of limiter structure 26 is formed from a flat, etched flexure blank 54 by bending the flexure free end 22, shown in FIG. 5A to be already etched to define the limiter structure 26. In FIG. 5 the limiter structure 26 is shown bent upward from the general plane of the tongue P-P to an angle of from about 45 to about 80 or 90 degrees. This bend 29 is the only bend in the tongue limiter member 28 so that the member continues straight out from the bend. Others have put multiple bends in their limiters but this entails increased manufacturing expense that is unnecessary when security of engagement can be obtained by the present two proximal members arrangement.

Flexure 14 is shown as a separate element from the beam portion 12, but could be integrated therewith and both made from a single piece of metal foil.

Returning to FIGS. 1-4, the tongue limiter member cross piece 36 is located above the tongue portion free end 22 and suitably opposite the slider 24. Slider 24 is shown to have in one embodiment of the invention a first portion 24a that is covered by the tongue free end 22, and a second portion 24b that is not covered by the free end, but which is exposed to the cross piece 36. In this manner, the limiter structure 26 is far closer to the dimple contact locus 52 than previously known limiters extending from a flexure. A typical suspension according to the invention will have a slider (containing the read/write heads) that is 0.049 inch long and 0.039 inch wide. The limiter structure 26 in a thusly dimensioned slider application can be located as close as 0.012 inch from the dimple, less than one-half the previously closest limiter of which the applicant is aware. Other proximity measures are provided below.

In certain other limiters (not shown) the free end of the flexure defines at its outermost part a limiter that interengages with the load beam or the flexure but which transmits the force along the length of the tongue, from the dimple, for example, to the free end outermost part and lacks the direct force transmission provided by this invention.

Tongue limiter member 28 engages suspension-defined cooperating part beam portion limiter member 56. Thus, the tongue limiter member cross piece 36, spaced above the slider 24—exposed second portion 24b, has a relatively thin cross-section dimension, low height, and is sized to interengage with the flat, proximally cantilevered member 56. In one embodiment, see FIG. 6, beam portion limiter member cooperating part 56 is defined by the beam portion 12 by forming an area 58 of the beam portion into a proximally extended and cantilevered shape that will receive and retain the tongue limiter member 28, as shown, with the tendency of the tongue limiter member to move farther down the beam portion limiter member as the tongue portion 18 moves away from the beam portion 12, for lessened chance of dislodgement as the extent of the tongue portion excursion increases. Typically the gap 62 between the cross piece 36 and the beam portion member 56 is about 0.004 inch but it can be more or less in particular applications, as the desired permissible travel and other factors require.

Figure 1:
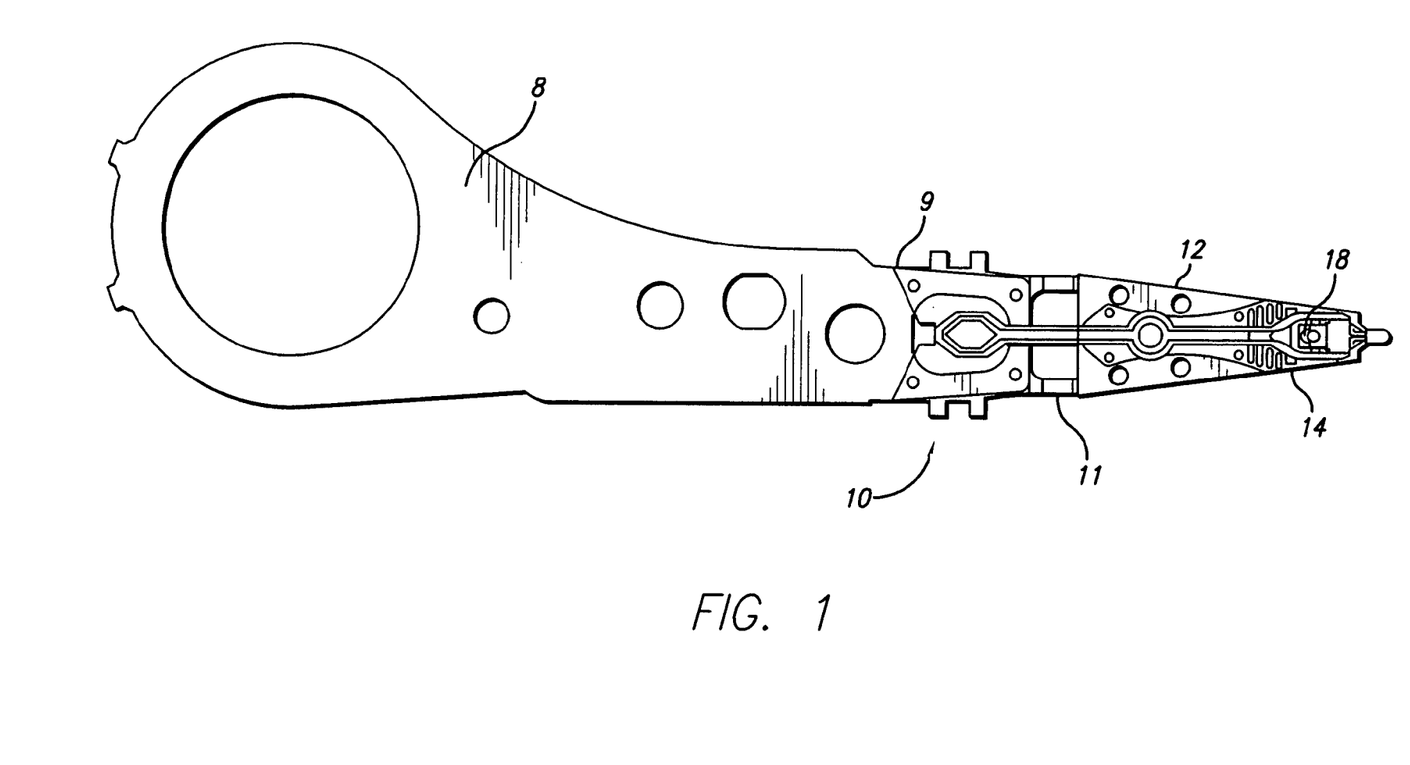
FIG. 1 is a top plan view of an improved suspension according to the invention.
Figure 1A:
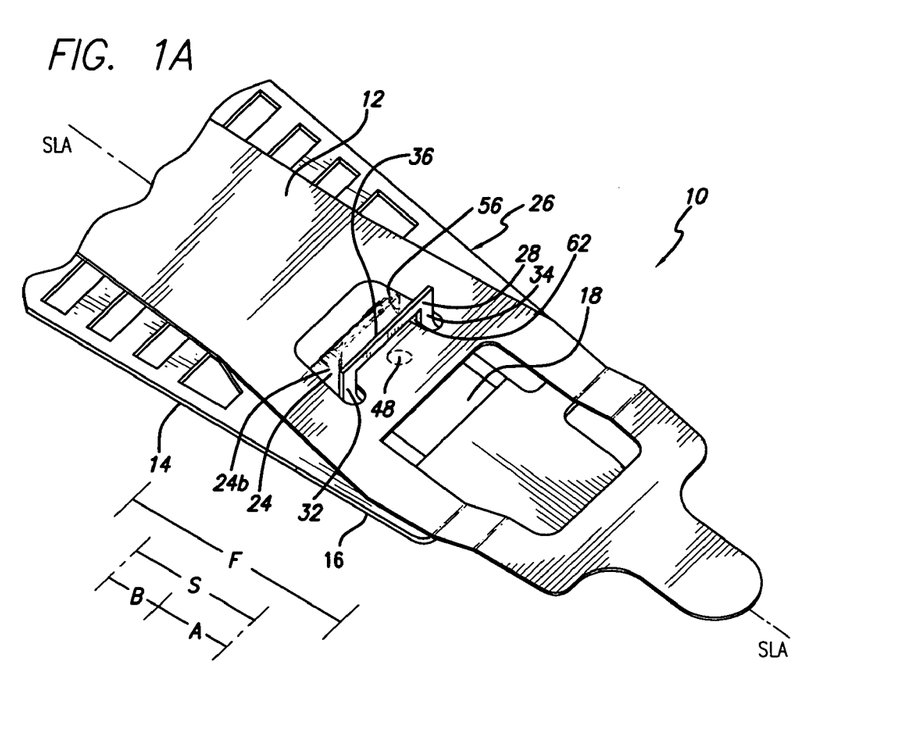
FIG. 1A is an oblique, fragmentary view thereof, showing the distal end of the suspension.
Figure 2:
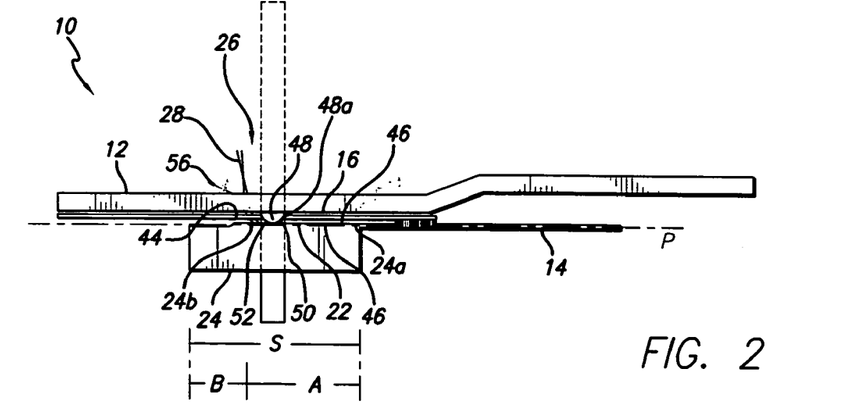
FIG. 2 is a side elevation view thereof.
Figure 3:
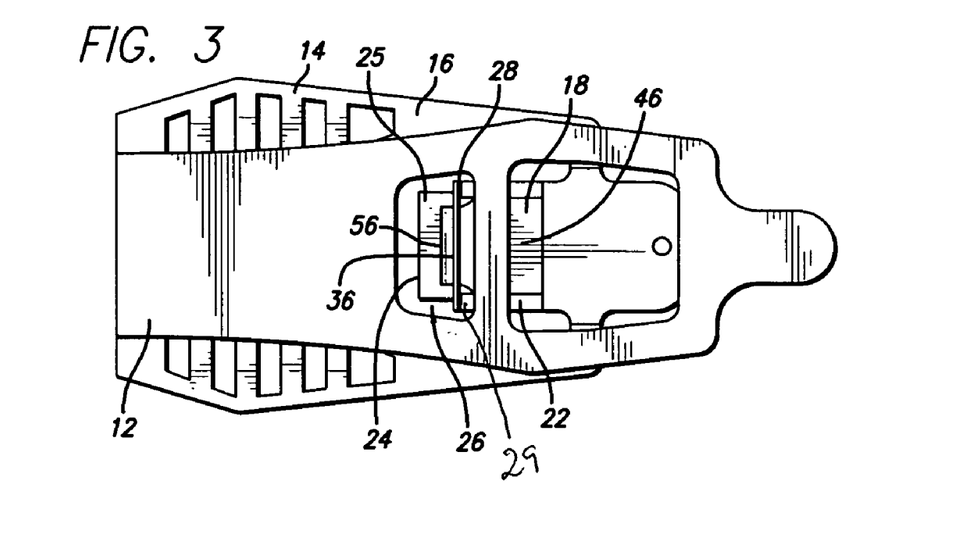
FIG. 3 is bottom plan view thereof.

In a further embodiment, and with reference particularly to FIGS. 1A and 2, suspension 10 comprises beam portion 12 and a separate flexure 14 carried by the beam portion. Flexure 14 comprises the open frame 16 having a given longitudinal extent F and a tongue portion 18 cantilevered within the frame extent under dimple 48 load from the beam portion 12. Slider 24 has first and second contiguous areas 24a, 24b. Slider 24 also has a given longitudinal extent S. First area 24a has a longitudinal extent A less than the slider longitudinal extent S and defines the locus 46 of slider attachment. Second area 24b has a longitudinal extent B less than one-half the slider given longitudinal extent S. Limiter structure 26 is defined opposite the second area 24b to limit the tongue portion 18 from undue travel, the limiter structure extending out of the plane P-P of the tongue free end 22. Beam portion 12 defines the beam portion member 56 as in the previous embodiment to engage the limiter structure against undue travel of the tongue portion 18.

In general, the dimple 48 extends in a cylindrical plane C-C that has the diameter D of the dimple. Limiter structure 26 is preferably substantially entirely within four cylindrical plane diameters (4×D) of the dimple perimeter 48a.

Figure 4:
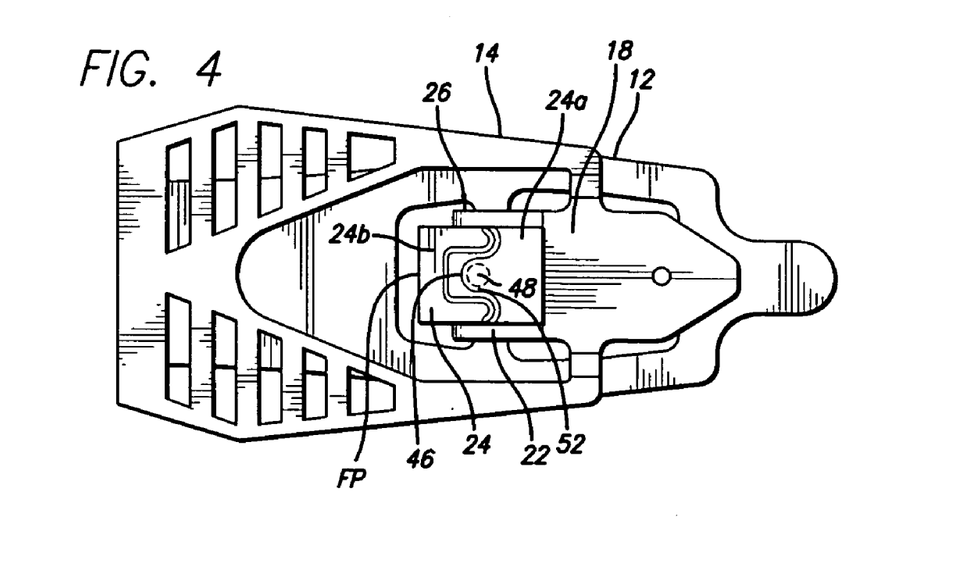
FIG. 4 is a top plan view thereof.

In general, slider 24 has a given footprint FP defined by its longitudinal and transverse sides, FIG. 4. The interiorly open tongue limiter member 28 has first interengaging part, cross piece 36, centered on the slider 24 longitudinal axis SLA and defined by the locally apertured free end 22, the end being deflected upward to be above the general plane of the tongue portion 18. FIG. 1A. In this embodiment, the limiter structure 26 further includes cooperating beam portion limiter member 56. The interengaging parts 28, 56 are opposed vertically above the slider footprint FP against undue travel of the tongue portion 18 and its slider 24.

In the invention method, undue relative movement is limited between beam portion 12 and flexure tongue portion 18 of disk drive suspension 10 where the flexure tongue has a cantilevered proximate end by cantilevering a beam portion limiter member 56 proximally, and cantilevering a tongue limiter member 28 proximally and vertically in beam portion member intersecting relation such that tongue portion travel away from the beam portion increasingly secures engagement of the limiter members. The method further includes defining the beam portion limiter member 56 as a flat extent coplanar with the beam portion 12, angling the tongue limiter member at about 45 to about 80 degrees to the beam portion limiter member, bracketing the beam portion limiter member with the tongue limiter member, supporting a slider 24 on the tongue portion, and maintaining the tongue limiter free of bends along its longitudinal axis other than bend 29 at said tongue.

The invention thus provides an improved disk drive suspension having an improved limiter structure against undue travel of the suspension tongue and slider under shock and under load-unload conditions through the provision of a limiter structure that includes a member vertically spaced from the slider and formed from the free proximate end of the cantilevered flexure tongue and a limiter structure cooperating part on the suspension beam portion cantilevered proximally like the tongue limiter member to interengage vertically with the tongue free end defined limiter structure to limit tongue free end travel.

The foregoing objects are thus met.

I claim:

1. A disk drive suspension comprising generally in a first plane a beam portion and in a second plane generally parallel to said first plane a flexure, said flexure having a proximally cantilevered tongue being adapted to carry a slider and having a proximate end, a limiter structure limiting travel of said tongue away from said beam portion, said limiter structure comprising intersected first and second proximally cantilevered members defined by said beam portion and said tongue proximate end respectively and arranged for engagement response to undue tongue travel, said tongue having a given lateral extent, and said tongue member having a lesser lateral extent.

2. The disk drive suspension according to claim 1, in which said beam portion member has a flat extent within said first plane, said tongue member engaging said beam portion member flat extent.

3. The disk drive suspension according to claim 1, in which said beam portion comprises a wall extending opposite said tongue proximate end, said wall being configured to define said beam portion member in tongue member engaging relation, said beam portion being otherwise free of tongue travel limiting members.

4. The disk drive suspension according to claim 1, including also a slider having a leading edge end at said tongue proximate end, and wherein said limiter structure is adjacent said slider leading edge end.

5. The disk drive suspension according to claim 1, in which said tongue member comprises left and right legs closely bracketing said beam portion member, and a cross-piece overlying said beam portion member, said cross piece having less vertical height from said tongue than said beam portion member has lateral width.

6. A disk drive suspension comprising generally in a first plane a beam portion and in a second plane generally parallel to said first plane a flexure, said flexure having a proximally cantilevered tongue being adapted to carry a slider and having a proximate end, a limiter structure limiting travel of said tongue away from said beam portion, said limiter structure comprising intersected first and second proximally cantilevered members defined by said beam portion and said tongue approximate end respectively and arranged for engagement response to undue tongue travel, wherein said tongue member extends from said second plane at an angle of about 45 to about 80 degrees, said beam portion member extending at an angle of about 0 degrees to said beam portion.

7. A disk drive suspension comprising generally in a first plane a beam portion and in a second plane generally parallel to said first plane a flexure, said flexure having a proximally cantilevered tongue being adapted to carry a slider and having a proximate end, a limiter structure limiting travel of said tongue away from said beam portion, said limiter structure comprising intersected first and second proximally cantilevered members defined by said beam portion and said tongue proximate end respectively and arranged for engagement response to undue tongue travel, wherein said tongue member is U-shaped and free of bends along its longitudinal axis other than at said tongue.

8. A disk drive suspension comprising generally in a first plane a beam portion and in a second plane generally parallel to said first plane a flexure, said flexure having a proximally cantilevered tongue being adapted to carry a slider and having a proximate end, a limiter structure limiting travel of said tongue away from said beam portion, said limiter structure comprising intersected first and second proximally cantilevered members defined by said beam portion and said tongue proximate end respectively and arranged for engagement response to undue tongue travel, wherein said tongue member has a cross piece and left and right legs bracketing said beam portion member, said legs being free of bends other than at said tongue.

9. A disk drive suspension comprising generally in a first plane a beam portion adapted to be supported by a spring portion and a base portion, said beam portion having a proximally cantilevered limiter member, a flexure carried by said beam portion, said flexure comprising a frame and a tongue portion generally in a second plane and having a tongue proximate end cantilevered from said frame for supporting a slider, and a limiter structure limiting said tongue from undue travel, said limiter structure comprising a tongue limiter member extending from said tongue proximate end into said first plane and arranged to bracket said beam portion limiter member, said tongue member shifting distally on said beam portion member responsive to increased tongue travel against tongue limiter member dislodgement from said beam portion limiter member in tongue undue travel limiting relation.

10. The disk drive suspension according to claim 9, in which said beam portion limiter member is flat for engagement with said tongue limiter member.

11. The disk drive suspension according to claim 9, in which said beam portion comprises a wall extending opposite said tongue proximate end, said wall being configured to define said beam portion limiter member in tongue limiter member engaging relation.

12. The disk drive suspension according to claim 9, in which tongue limiter member extends at an angle to said beam portion limiter member of about 45 to about 80 degrees.

13. The disk drive suspension according to claim 9, in which said tongue limiter member is straight beyond said tongue.

14. The disk drive suspension according to claim 9, in which said tongue has a given lateral extent, said tongue limiter member having a lesser lateral extent.

15. The disk drive suspension according to claim 9, including also a slider having a leading edge end at said tongue proximate end, whereby said limiter structure is adjacent said slider leading edge end.

16. The disk drive suspension according to claim 9, in which said tongue limiter member comprises left and right legs bracketing said beam portion limiter member, and a cross-piece overlying said beam portion limiter member, said cross piece having less vertical height than said beam portion limiter member has lateral width.

17. A method of limiting undue relative movement between a beam portion and flexure tongue in a disk drive suspension, said flexure tongue having a cantilevered proximate end, including cantilevering a beam portion limiter member proximally, an cantilevering a tongue limiter member proximally and vertically in beam portion member intersecting relation, and angling said tongue limiter member at about 45 to about 80 degrees to said beam portion limiter member.

18. The method according to claim 17, including also defining said beam portion limiter member as a flat extent coplanar with said beam portion.

19. The method according to claim 17, including also bracketing said beam portion limiter member with said tongue limiter member.

20. The method according to claim 17, including also supporting a slider on said tongue.

21. The method according to claim 17, including also maintaining said tongue limiter free of bends other than at said tongue.

22. A disk drive suspension comprising generally in a first plane a beam portion and in a second plane generally parallel to said first plane a flexure, said flexure having a proximally cantilevered tongue being adapted to carry a slider, a limiter structure limiting travel of said tongue away from said beam portion, said limiter structure comprising a beam portion member engaging a tongue member in response to undue tongue travel, said tongue member being U-shaped and otherwise free of bends along its longitudinal axis other than at said tongue.

23. The disk drive suspension of claim 22, wherein said tongue member is disposed at a proximate end of said tongue, and said beam portion member engages said tongue member such that tongue travel away from said beam portion increasingly secures the engagement of said members.

24. The disk drive suspension according to claim 22, wherein said tongue member extends from said second plane at an angle of about 45 to about 90 degrees, said beam portion member extending at an angle of about 0 degrees to said beam portion.

25. The disk drive suspension according to claim 22, in which said tongue has a given lateral extent, and said tongue member has a lesser lateral extent.

26. The disk drive suspension according to claim 25, in which said slider has a leading edge end at said tongue proximate end and a trailing edge end, said limiter structure being more closely adjacent said slider leading edge end.

27. The disk drive suspension according to claim 22, in which said tongue member comprises left and right legs bracketing said beam portion member, and a cross-piece overlying said beam portion member, said cross piece having less vertical height from said tongue than said beam portion member has lateral width.

28. The disk drive suspension according to claim 22, wherein said tongue member has legs and a crosspiece that bracket said beam portion member, said legs being free of bends other than at said tongue.

* * * * *

UNITED STATES PATENT AND TRADEMARK OFFICE
CERTIFICATE OF CORRECTION

PATENT NO. : 7,298,590 B1  Page 1 of 1
APPLICATION NO. : 10/952283
DATED : November 20, 2007
INVENTOR(S) : Shijin Mei It is certified that error appears in the above-identified patent and that said Letters Patent is hereby corrected as shown below:

Col. 8 line 44, after "member proximally," delete "an".

Signed and Sealed this

Fifteenth Day of April, 2008

JON W. DUDAS
*Director of the United States Patent and Trademark Office*